US012147304B2

(12) United States Patent
Gomes et al.

(10) Patent No.: US 12,147,304 B2
(45) Date of Patent: Nov. 19, 2024

(54) DIAGNOSE INSTRUCTION TO RESTORE MACHINE STATE AND ASSOCIATED STORAGE KEYS

(71) Applicant: INTERNATIONAL BUSINESS MACHINES CORPORATION, Armonk, NY (US)

(72) Inventors: Louis P. Gomes, Poughkeepsie, NY (US); David Harold Surman, Milton, NY (US); Seth E. Lederer, Staatsburg, NY (US); James H. Mulder, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 85 days.

(21) Appl. No.: 18/171,153

(22) Filed: Feb. 17, 2023

(65) Prior Publication Data
US 2024/0281335 A1    Aug. 22, 2024

(51) Int. Cl.
| | | |
|---|---|---|
| *G06F 11/00* | (2006.01) | |
| *G06F 9/4401* | (2018.01) | |
| *G06F 11/07* | (2006.01) | |
| *G06F 11/14* | (2006.01) | |

(52) U.S. Cl.
CPC ........ *G06F 11/1438* (2013.01); *G06F 9/4401* (2013.01); *G06F 11/0703* (2013.01); *G06F 11/1402* (2013.01); *G06F 11/1448* (2013.01); *G06F 2201/805* (2013.01)

(58) Field of Classification Search
CPC ............. G06F 11/0703; G06F 11/1402; G06F 11/1438; G06F 11/1448
See application file for complete search history.

(56) References Cited

U.S. PATENT DOCUMENTS

| 5,737,575 | A | * | 4/1998 | Blaner | ................ | G06F 12/0875 |
|---|---|---|---|---|---|---|
| | | | | | | 711/E12.095 |
| 8,588,425 | B1 | * | 11/2013 | Harwood | ............ | G06F 12/1408 |
| | | | | | | 380/278 |
| 10,152,367 | B2 | | 12/2018 | Farinacci et al. | | |
| 10,198,343 | B2 | | 2/2019 | Rehman et al. | | |
| 10,270,596 | B2 | | 4/2019 | Bacher et al. | | |
| 10,467,078 | B2 | | 11/2019 | Hammer et al. | | |
| 10,621,029 | B2 | | 4/2020 | Prasad et al. | | |
| 10,891,226 | B1 | | 1/2021 | Leedham et al. | | |
| 11,275,759 | B2 | | 3/2022 | Li et al. | | |

(Continued)

OTHER PUBLICATIONS

Xu et al.; "CREDAL: Towards Locating A Memory Corruption Vulnerability With Your Core Dump", CCS'16 Proceedings of the 2016 ACM SIGSAC Conference on Computer and Communications Security, pp. 529-540, Oct. 2016.

(Continued)

*Primary Examiner* — Joshua P Lottich
(74) *Attorney, Agent, or Firm* — Edward J. Wixted, III, Esq.; Blanche E. Schiller, Esq.; Heslin Rothenberg Farley & Mesiti P.C.

(57) ABSTRACT

An instruction that includes an operation code indicating a diagnose operation is obtained and executed within a computing environment. The executing the instruction includes retrieving selected data from a dump save area to be used to restore machine state and restoring the machine state. The restoring includes storing the selected data in a selected location. One or more storage keys used to protect access to the selected data are restored.

20 Claims, 10 Drawing Sheets

(56) References Cited

U.S. PATENT DOCUMENTS

| | | | |
|---|---|---|---|
| 11,431,481 B2 | 8/2022 | Toal et al. | |
| 2003/0163717 A1* | 8/2003 | Yoshimoto | G06F 21/78 |
| | | | 713/193 |
| 2006/0225044 A1 | 10/2006 | Lewis | |
| 2011/0225458 A1 | 9/2011 | Zuo et al. | |
| 2013/0145218 A1 | 6/2013 | Laor | |
| 2013/0318312 A1 | 11/2013 | Eastman et al. | |
| 2017/0262328 A1* | 9/2017 | Hirose | G06F 11/0778 |
| 2017/0357544 A1 | 12/2017 | Adler et al. | |
| 2018/0114020 A1* | 4/2018 | Hirschberg | G06F 21/566 |
| 2022/0164249 A1 | 5/2022 | Sassara et al. | |
| 2022/0263657 A1* | 8/2022 | Chang | G06F 21/602 |

OTHER PUBLICATIONS

Song et al.; "DEEPMEM: Learning Graph Neural Network Models for Fast and . . . Memory Forensic Analysis", CCS'18 Proceedings of the 2018 ACM SIGSAC Conference on Computer and Communications Security, pp. 606-618, Oct. 2018.

Groß* et al.; "One Key To Rule Them All: Recovering . . . File-Based Encryption", Forensic Science International: Digital Investigation, vol. 36, pp. 1-10, Apr. 2021.

Sun et al.; "TrustDump: Reliable Memory Acquisition on Smartphones", ESORICS 2014, 19th European Symposium on Computer Security, pp. 1-19, Sep. 7-11, 2014.

Brengel et al.; "MEMSCRIMPER: Time- and Space-Efficient Storage of Malware Sandbox Memory Dumps", Dima Gi 15th International Conference on Detection of Intrusions and Malware, and Vulnerability Assessment, pp. 1-21, Jun. 2018.

IBM, "z/Architecture Principles of Operation," IBM Publication No. SA22-7832-12, Thirteenth Edition, Sep. 2019, 2000 pages.

Notification of Transmittal of the International Search Report and the Written Opinion of the International Searching Authority, or the Declaration, PCT/EP2024/052578, May 3, 2024, pp. 1-13.

* cited by examiner

DIAGNOSE INSTRUCTION TO RESTORE MACHINE STATE AND ASSOCIATED STORAGE KEYS

BACKGROUND

One or more aspects relate, in general, to facilitating processing within a computing environment, and in particular, to improving data restoration processing within the computing environment.

Situations exist in which data is saved for later retrieval, if needed. As an example, during initial program load of a program, a boot loader is loaded into memory and used to perform the initial program load prior to passing control to the program. Based on the program receiving control from the boot loader, the program is free to use the memory previously occupied and used by the boot loader for its own purposes.

If, at a later time, an error is encountered, a dump program may be loaded to save selected data of the program's memory (e.g., data that was overlaid) to a storage device for later use in debugging. To load the dump program, an initial program load is performed. As part of the initial program load of the dump program, selected data is saved prior to loading the boot loader, which will load the dump program. The retrieval and restoration of this data is to be facilitated.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes obtaining an instruction to be executed within a computing environment. The instruction includes an operation code indicating a diagnose operation. The instruction is executed. The executing includes retrieving selected data from a dump save area to be used to restore machine state and restoring the machine state. The restoring includes storing the selected data in a selected location. One or more storage keys used to protect access to the selected data are restored.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1A:
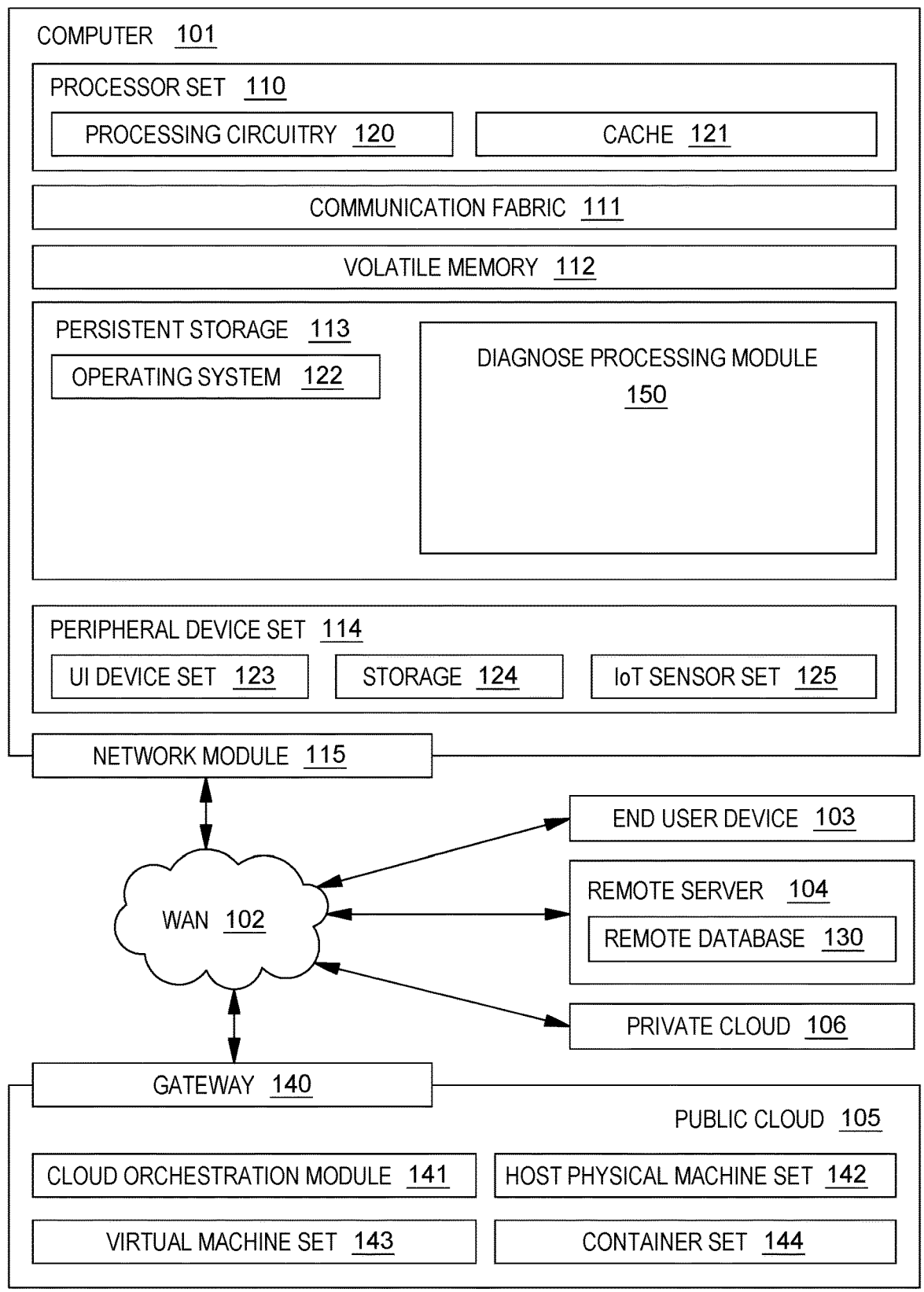
FIG. 1A depicts one example of a computing environment to incorporate and use one or more aspects of the present invention.

In accordance with one or more aspects of the present invention, a capability is provided to facilitate processing within a computing environment. In one aspect, the capability includes facilitating processing relating to restoring machine state (e.g., original data), based on selected conditions (e.g., errors). In one example, the capability includes using an instruction (e.g., a single architected instruction) to retrieve data from a selected area, restore machine state using the retrieved data, and to restore storage keys related to the retrieved data.

In one or more aspects, the instruction is issued by an entity (e.g., a dump program, a boot loader, etc.) to retrieve selected portions of data (e.g., of an operating system, a logical partition, etc.) from the selected area (e.g., a dump save area). The retrieved data is used to restore machine state (e.g., original data saved to the dump save area) and to restore storage keys related to the selected portions of data.

In one or more aspects, the instruction is used (e.g., in one execution) to perform one or more other functions including, but not limited to, releasing the selected area for other use, creating an unenabled wait program status word (PSW), and/or end an initial program load (IPL) currently being performed.

In one or more aspects, the instruction is configured to include a plurality of subcodes, and a particular subcode is selected for a particular execution of the instruction. One or more functions, based on the selected subcode, are performed in the particular execution of the instruction. The instruction may be issued by one or more components of a computing environment, including, but not limited to, a program, such as a dump program, a boot loader, etc. Many options and/or variations are possible.

In one or more aspects, the instruction is referred to herein as a diagnose instruction and the processing associated with the instruction including the restoration processing, is referred to herein as diagnose processing. The instruction may be used by other programs and/or entities and/or for other purposes. Many variations and options are possible.

One or more aspects of the present invention are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that, e.g., performs diagnose processing (including execution of selected subcodes of a diagnose instruction) and/or one or more other aspects of the present invention. Aspects of the present invention are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 1A. In one example, a computing environment 100 contains an example of an environment for the execution of at least some of the computer code involved in performing the inventive methods, such as diagnose processing code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1A. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. For instance, in one or more embodiments, one or more of the components/modules of FIG. 1A are not included in the computing environment and/or are not used for one or more aspects of the present invention. Further, in one or more embodiments, additional and/or other components/modules may be used. Other variations are possible.

Figure 1B:
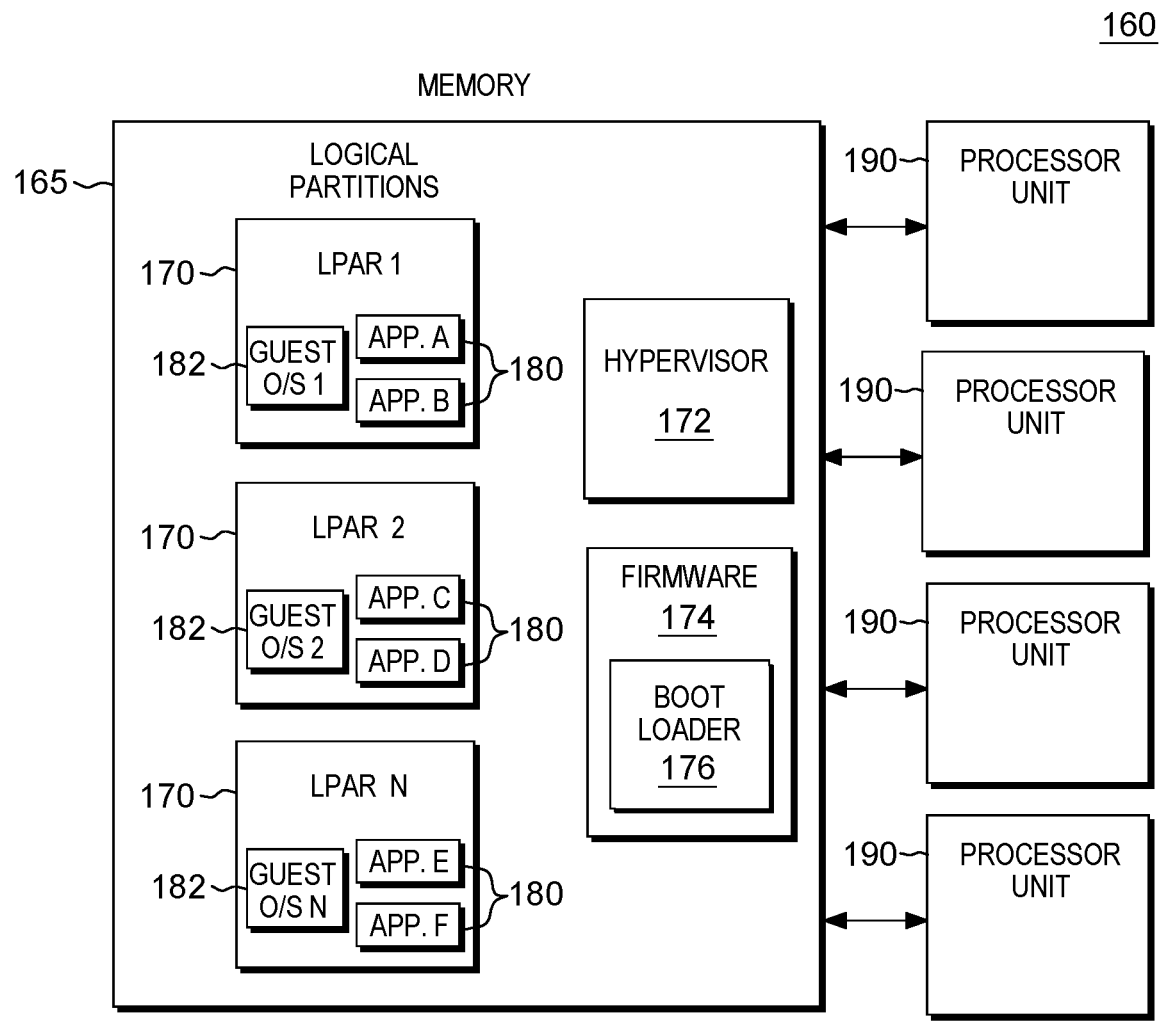
FIG. 1B depicts another example of aspects of a computing environment to incorporate and use one or more aspects of the present invention.

Another example of aspects of a computing environment to incorporate, use and/or perform one or more aspects of the present invention is described with reference to FIG. 1B. In one example, a computing environment 160 supports logical partitioning, and includes, for instance, a memory 165 (a.k.a., system memory, main memory, main storage, central storage, storage; e.g., persistent storage, such as persistent storage 113; other storage; etc.) coupled to one or more processor units 190 (e.g., central processing units (CPUs), other types of processors, etc.) of, e.g., a processor set (e.g. processor set 110).

Memory 165 includes, for example, one or more logical partitions 170, a logical partition manager, such as a hypervisor 172, and firmware 174. One example of hypervisor 172 is an IBM® PR/SM™ (Processor Resource/System Manager) logical partition manager, offered by International Business Machines Corporation, Armonk, New York. IBM and PR/SM are trademarks or registered trademarks of International Business Machines Corporation in at least one jurisdiction.

Logical partitioning support provides the ability to operate large numbers of logical partitions 170, each capable of operating with different programs 180 and running a guest operating system 182. Each logical partition 170 is capable of functioning as a separate system. That is, each logical partition can be independently reset, run a guest operating system, and operate with different programs. An operating system or application program running in a logical partition appears to have access to a full and complete system, but in reality, only a portion of it is available.

In one example, a logical partition 170 includes one or more logical processors, each of which represents all or a share of a physical processor resource (e.g., processor unit 190) that may be dynamically allocated to the logical partition.

Firmware 174 includes, e.g., the microcode of the processor and/or of the system. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware.

In one example, firmware 174 includes a boot loader 176 used in initial program loading (IPL) of a selected program, such as an operating system or, in accordance with one or more aspects of the present invention, a dump program used to capture machine state (e.g., data of a selected data area, such as a program's (e.g., operating system's) data area) at a particular time. Initial program loading provides a mechanism for causing a program (e.g., an operating system, a dump program) to be read from a designated device and for initiating the execution of that program. In one or more embodiments, the boot loader code (also referred to as a boot loader, e.g., boot loader 176) is loaded, copied or otherwise exists in firmware and is used in performing an initial program load of a program (e.g., an operating system, a dump program). One particular type of initial program load is a list-directed initial program load, which allows a program (e.g., an operating system, a dump program) to be loaded from various types of input/output devices.

Figure 2:
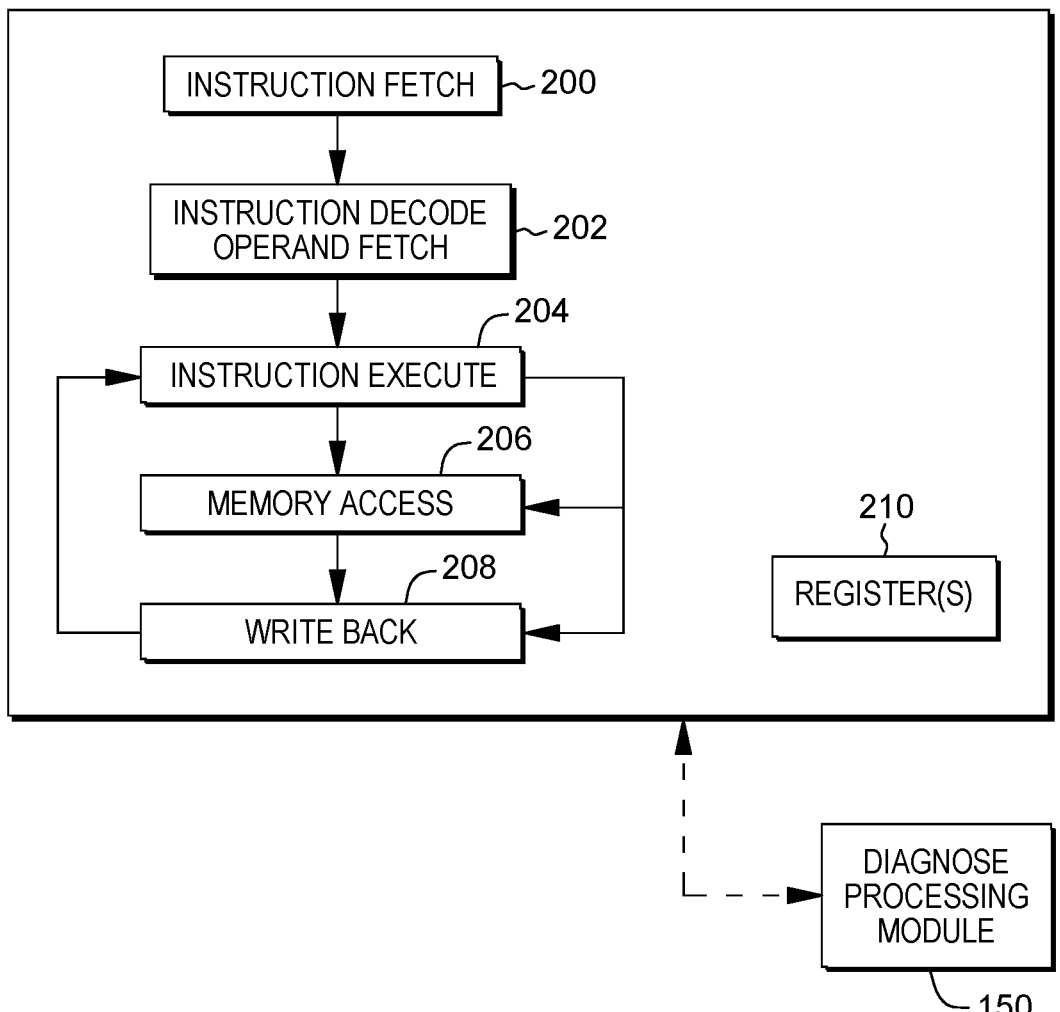
FIG. 2 depicts one example of further details of a processor or processor unit, in accordance with one or more aspects of the present invention.

Programs loaded by initial program load, or otherwise initiated, execute instructions to perform operations within the computing environment. To execute the instructions, in one example, functional components of, e.g., a processor unit or processor (e.g., of processor set 110), are used. One example of functional components used to execute instructions is described with reference to FIG. 2. In one example, functional components used to execute instructions include, for instance, an instruction fetch component 200 to fetch instructions to be executed; an instruction decode/operand fetch component 202 to decode the fetched instructions and to obtain operands of the decoded instructions; one or more instruction execute components 204 to execute the decoded instructions; a memory access component 206 to access memory for instruction execution, if necessary; and a write back component 208 to provide the results of the executed instructions. One or more of the components may access and/or use one or more registers 210 in instruction processing. Further, one or more of the components may access and/or use diagnose processing module 150. Additional, fewer and/or other components may be used in one or more aspects of the present invention.

A diagnose processing module (e.g., diagnose processing module 150) includes code or instructions used to perform diagnose processing, in accordance with one or more aspects of the present invention. A diagnose processing module (e.g., diagnose processing module 150) includes, in one example, various sub-modules to be used to perform the processing. The sub-modules are, e.g., computer readable program code (e.g., instructions) in computer readable media, e.g., storage (storage 124, persistent storage 113, cache 121, other storage, as examples). The computer readable media may be part of a computer program product and the computer readable program code may be executed by and/or using one or more computing devices (e.g., one or more computers, such as computer(s) 101; one or more servers, such as remote server(s) 104; one or more processors, such as a processor unit or processor of processor set 110; and/or processing circuitry, such as processing circuitry 120 of processor set 110; other computing devices, etc.). Additional, fewer and/or other computers, servers, processors, processing circuitry and/or computing devices may be used to execute one or more of the sub-modules and/or portions thereof. Many examples are possible.

Figure 3A:
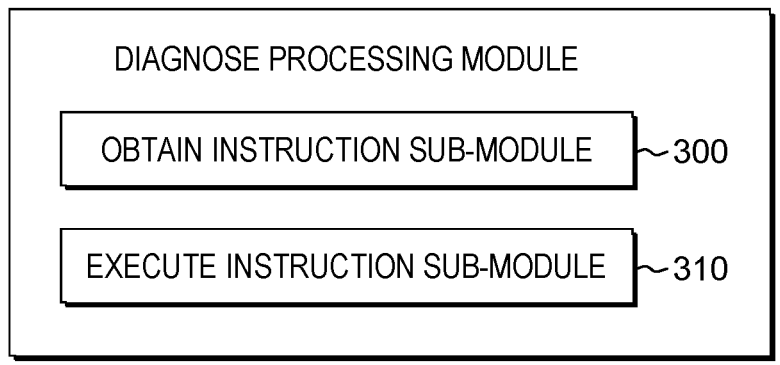
FIG. 3A depicts one example of sub-modules of a diagnose processing module of, e.g., FIG. 1A, in accordance with one or more aspects of the present invention.

One example of diagnose processing module 150 is described with reference to FIG. 3A. In one example, diagnose processing module 150 includes an obtain instruction sub-module 300 to obtain (e.g., receive, be provided, pull, retrieve, fetch, be issued, etc.) a diagnose instruction to be executed, and an execute instruction sub-module 310 to be used to execute the diagnose instruction.

Figure 3B:
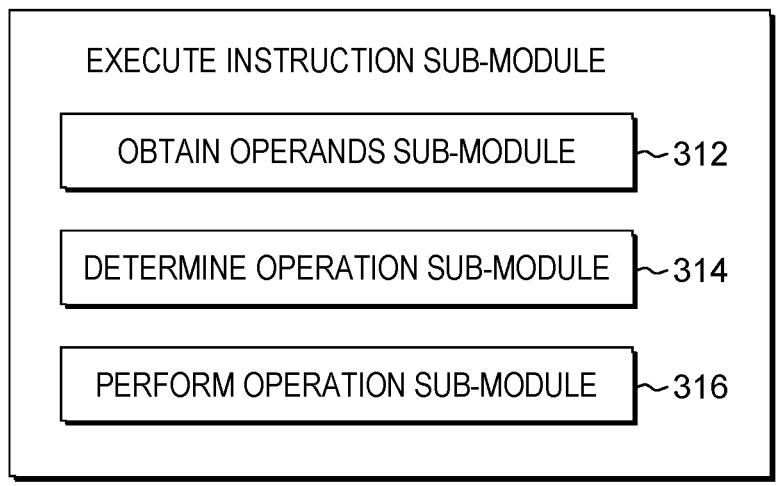
FIG. 3B depicts one example of sub-modules of the execute instruction sub-module of FIG. 3A, in accordance with one or more aspects of the present invention.

In one example, referring to FIG. 3B, execute instruction sub-module 310 includes, for instance, an obtain operands sub-module 312 to obtain one or more operands of the diagnose instruction; a determine operation sub-module 314 to determine the operation to be performed by the diagnose instruction; and a perform operation sub-module 316 to perform the determined operation. Additional, fewer and/or other sub-modules may be used to implement the diagnose processing, including execution of a diagnose instruction and/or other processing associated therewith.

Figure 4A:
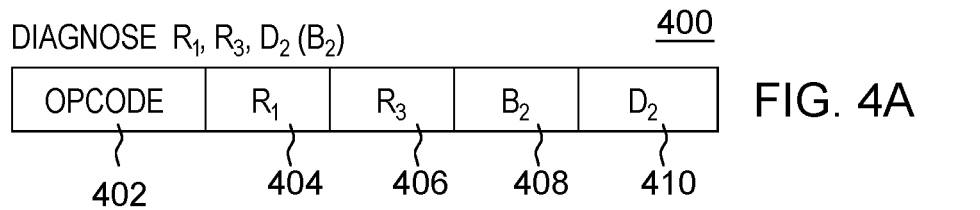
FIG. 4A depicts one example of a format of a diagnose instruction, in accordance with one or more aspects of the present invention.

One example of a diagnose instruction is described with reference to FIG. 4A. In one embodiment, a diagnose instruction, such as a Diagnose instruction 400 (also referred to, in one particular architecture, as Diagnose '0308'), is a single architected hardware machine instruction at the hardware/software interface. It is configured to include a plurality of subcodes and a particular subcode is indicated in an invocation of the instruction. Performance of each subcode includes performing one or more functions as part of execution of the diagnose instruction specifying the subcode.

As an example, the diagnose instruction, in one implementation, is part of an instruction set architecture. One example of an instruction set architecture to incorporate and/or use a diagnose instruction and/or aspects of the present invention is the IBM® z/Architecture® instruction set architecture offered by International Business Machines Corporation, Armonk, New York. One embodiment of the z/Architecture instruction set architecture is described in a publication entitled, "z/Architecture Principles of Operation," IBM Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities/companies may include and/or use one or more aspects of the present invention. z/Architecture is a trademark or registered trademark of International Business Machines Corporation in at least one jurisdiction.

In one example, Diagnose instruction 400 has a format, referred to as a register and storage operand format, having, e.g., 32 bits. In this particular example, Diagnose instruction 400 has an operation code (e.g., opcode) field 402 (e.g., bits 0-7) specifying a diagnose operation; one register (e.g., $R_1$) field 404 (e.g., bits 8-11) specifying at least one general purpose register used in execution of the Diagnose instruction; another register (e.g., $R_3$) field 406 (e.g., bits 12-15) specifying at least one general purpose register used in execution of the Diagnose instruction; a base register field (e.g., $B_2$) 408 (e.g., bits 16-19) specifying a base register; and a displacement (e.g., $D_2$) field 410 (e.g., bits 20-31) specifying a displacement value which is added to a value in a base register specified in base register field 408 to provide a value to be used as an operation code extension for the Diagnose instruction 400. Each of the fields is further described below.

In one embodiment, the fields of the instruction are separate and independent from one another; however, in other embodiments, more than one field may be combined. Further, a field may be extended to more than one location. For instance, a field, may be in one set of bits and extend to another set of bits separate from the one set of bits (e.g., in the beginning of the instruction format and at the end of the instruction format; and/or variations thereof). Although example types of registers are specified, other types of registers may be used. Moreover, although example locations within the instruction format are provided, other locations may be used for one or more of the instruction fields. A diagnose instruction, such as Diagnose instruction 400, may have additional, fewer and/or other fields. Other examples are possible.

Further, in the description herein of a diagnose instruction, such as Diagnose instruction 400, specific locations, specific fields and/or specific sizes of the fields may be indicated (e.g., specific bytes and/or bits). However, other locations, fields and/or sizes may be provided. Further, although the setting of a bit to a particular value, e.g., one or zero, may be specified, this is only an example. The bit, if set, may be set to a different value, such as the opposite value or to another value, in other examples. Many variations are possible.

If a field has a subscript number associated therewith, the subscript number associated with the field denotes the operand to which the field applies. For instance, subscript number 1 associated with register $R_1$ denotes that the register(s) specified using $R_1$ includes the first operand, subscript number 2 associated with base register $B_2$ and $D_2$ denotes a second operand, and so forth.

In one example of Diagnose instruction 400, contents of the $D_2$ field 410 are added to the contents of a general register specified in $B_2$ 408. The result is not used to address data; instead, selected bits (e.g., bits 0-47) are ignored and other selected bits (e.g., bits 48-63) are used as an operation code extension. When the operation code extension is a selected operation code (e.g., '0308' hex), an initial program load-related function is performed.

In one example, a diagnose instruction (e.g., Diagnose instruction 400 with the selected operation code extension (e.g., '0308' hex)) provides various functions associated with initial program loading (IPL). For instance, it provides reset functions used during a list-directed initial program load process, functions to initiate an initial program load, and functions to set and store initial program load parameters.

As indicated, in one embodiment, the Diagnose instruction implements a plurality of subcodes, two of which are provided, in accordance with one or more aspects of the present invention. These subcodes are referred to as subcodes 11 and 12 but may be referred to in other ways.

In one or more aspects, the use of $R_1$ field 404 depends on the subcode specified in general register $R_3$ of $R_3$ field 406, as described herein. For instance, selected positions (e.g., bit positions 48-63) of general register $R_3$ contain an unsigned binary integer (e.g., 16-bit) that specifies a subcode. This subcode in $R_3$ is validated for invocations of Diagnose '0308'. Further, in one example, selected positions (e.g., bit positions 0-47) of general register $R_3$ vary based upon the subcode value. In one example, for subcodes 11 and 12, bit 47 of general register $R_3$ is reserved and is to be zero. Other variations and/or options are possible.

As examples, subcode 11 is, for instance, a Load Dump Pages From List-Directed IPL Dump Save Area operation, and subcode 12 is, for instance, a Restore Dump Pages From List-Directed Dump Save Area and Terminate IPL operation. Subcodes 11 and 12 may be issued from any central processing unit, in one embodiment. Each of the subcodes is further described below.

Subcode 11—Load Dump Pages from List-Directed IPL Dump Save Area

Figure 4B:
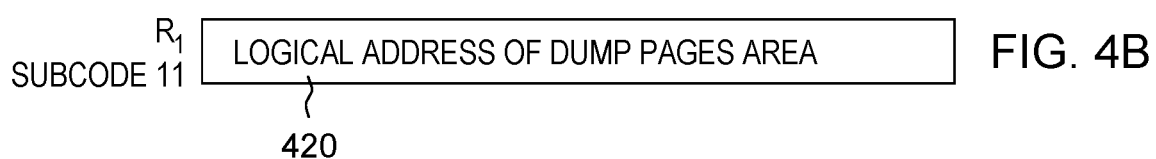
FIGS. 4B-4C depict one example of fields of a register pair used by one example execution of the diagnose instruction of FIG. 4A, in accordance with one or more aspects of the present invention.

In one embodiment, when subcode 11 is specified, the $R_1$ field 404 is to designate an even register of an even-odd pair of general registers; otherwise, a specification exception is recognized, in one example. The $R_1+1$ field is the odd register of the even-odd pair. In one example, referring to FIG. 4B, contents 404a of general register $R_1$ designate, for instance, a starting address 420 (e.g., the starting absolute address) of a storage area where a specified range of storage pages and their associated storage keys are to be restored from a dump save area. The address is to be designated, e.g., on a 4K-byte boundary; otherwise, a specification exception is recognized, in one example.

Figure 4C:
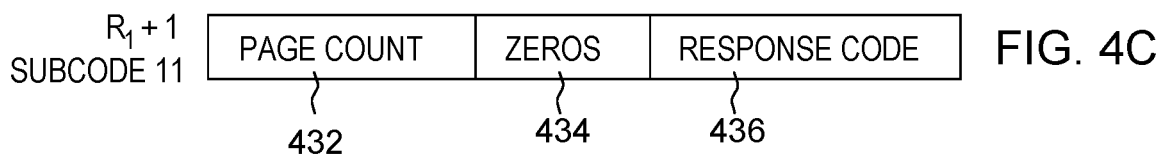

Further, in one example, referring to FIG. 4C, contents 430a of general register $R_1+1$ are described. In one example, selected positions (e.g., bit positions 0-31) of general register $R_1+1$ contain an unsigned binary integer (e.g., 32-bit) that specifies a count 432 of pages of the dump save area that is to be restored beginning with a starting page number of the dump save area (specified in $R_3$). A response code 436 is returned in, e.g., selected positions (e.g., bit positions 48-63) of general register $R_1+1$. Certain positions (e.g., bit positions 32-47) of general register $R_1+1$ are set to, e.g., zeros 434 or another value. A selected response code 436 (e.g., 0001 hex) indicates that the operation completed successfully. Another selected response code 436 (e.g., 0002 hex) indicates that the operation was partially successful.

Figure 4D:
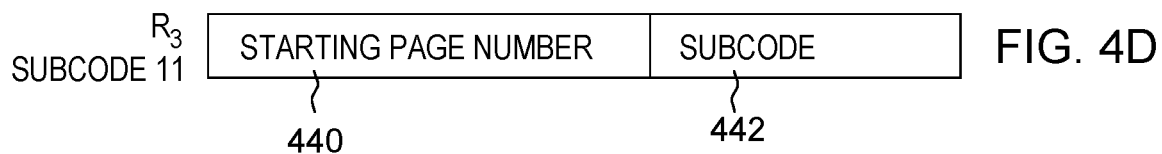
FIG. 4D depicts one example of fields of a register used by one example execution of the diagnose instruction of FIG. 4A, in accordance with one or more aspects of the present invention.

Referring to FIG. 4D, in one example, contents 406a of general register $R_3$ are described. In one example, when subcode 11 is specified, selected positions (e.g., bit positions 0-31) of general register $R_3$ contain an unsigned binary integer (e.g., 32-bit) that specifies a starting page number 440 (0-N) of the dump save area from which the dump data and associated storage keys are to be restored; and as indicated, selected positions (e.g., bit positions 0-31) of general register $R_1+1$ specify the count 432 of pages of the dump save area that is to be restored beginning with the starting page number of the dump save area. If the starting page number is, e.g., greater than the number of pages available in the dump save area, or the sum of the page count and the current page number is greater than the number of pages available in the dump save area, a selected response code 436 (e.g., 0203 hex) is returned in, e.g., selected positions of general register $R_1+1$ and no data or storage keys are stored. Storage accesses to the storage area where the specified range of storage pages and their associated storage keys are to be restored, pointed by the contents of general register $R_1$, are not subject, in one example, to low-address protection and key controlled protection.

In operation, in one example, subcode 11 (i.e., e.g., execution of Diagnose instruction 400 with subcode 442 set to 11) stores the specified range of storage pages from the dump save area owned by the configuration (e.g., logical partition, operating system, etc.) into the specified storage area pointed to by logical address 420 in, e.g., general register $R_1$. The storage keys associated with the restored main storage in the configuration are set to the storage keys of the main storage that were present at the time when the main storage was saved in the dump save area.

When the issuing configuration does not own a dump save area, a selected response code 436 (e.g., 0304 hex) is returned in selected positions (e.g., bit positions 48-63) of general register $R_1+1$ and no data or storage keys are stored.

When the page count 432 specified in general register $R_1+1$ is set to, e.g., zero and the issuing configuration owns a dump save area, a selected response code 436 (e.g., 0001 hex) is returned in, e.g., selected positions (e.g., bit positions 48-63) of general register $R_1+1$ and no data or storage keys are stored.

When an error is encountered while restoring one or more storage pages in the specified storage range, a selected response code 436 (e.g., 0002 hex) is returned in, e.g., selected positions (e.g., bit positions 48-63) of general register $R_1+1$. The contents of any such storage pages are unpredictable. In one example, no indication is given as to which pages in the specified storage range are affected. In another example, when a storage page cannot be restored, an error indication is provided in, e.g., multiple formats. For instance, a page of zeros with, e.g., an identifying string is stored in its place. The identifying string is stored in multiple formats (e.g., EBCDIC (Extended Binary Coded Decimal Interchange Code), ASCII (American Standard Code for Information Interchange), etc.) such that the error indication is in a readable format regardless of the format used to view the data of the storage.

When an error is encountered while restoring a storage key for any of the storage pages in the specified storage range, a selected response code 436 (e.g., 0002 hex) is returned in, e.g., selected positions (e.g., bit positions 48-63) of general register $R_1+1$. The contents of any such storage keys are unpredictable. In one example, no indication is given as to which storage pages in the specified storage range are affected.

In accordance with one or more aspects of the present invention, diagnose processing, including execution of a diagnose instruction, such as Diagnose instruction 400, is performed using a diagnose process. Examples of such a process are described with reference to FIGS. 5A-5C. In one example, a diagnose process (e.g., a diagnose process 500) may be implemented using one or more sub-modules (e.g., one or more of sub-modules 300-316) and is executed by one or more computing devices (e.g., one or more computers (e.g., computer(s) 101, other computer(s), etc.), one or more servers (e.g., server(s) 104, other server(s), etc.), one or more processor(s), processor unit(s), node(s) and/or processing circuitry, etc. (e.g., of processor set 110 or other processor sets), and/or other computing devices, etc.). Although example computing devices, computers, servers, processors, processor units, nodes and/or processing circuitry are provided, additional, fewer and/or other computers, servers, processors, processor units, nodes, processing circuitry and/or computing devices may be used for the diagnose process and/or other processing. Various options are possible.

Figure 5A:
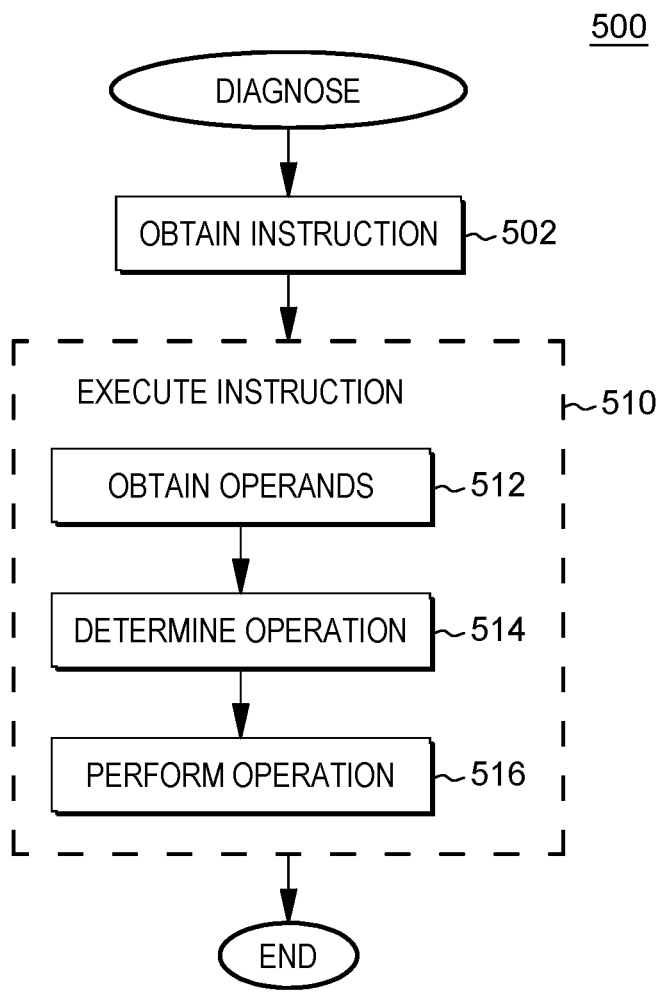
FIG. 5A depicts one example of diagnose instruction processing, in accordance with one or more aspects of the present invention.
Figure 5B:
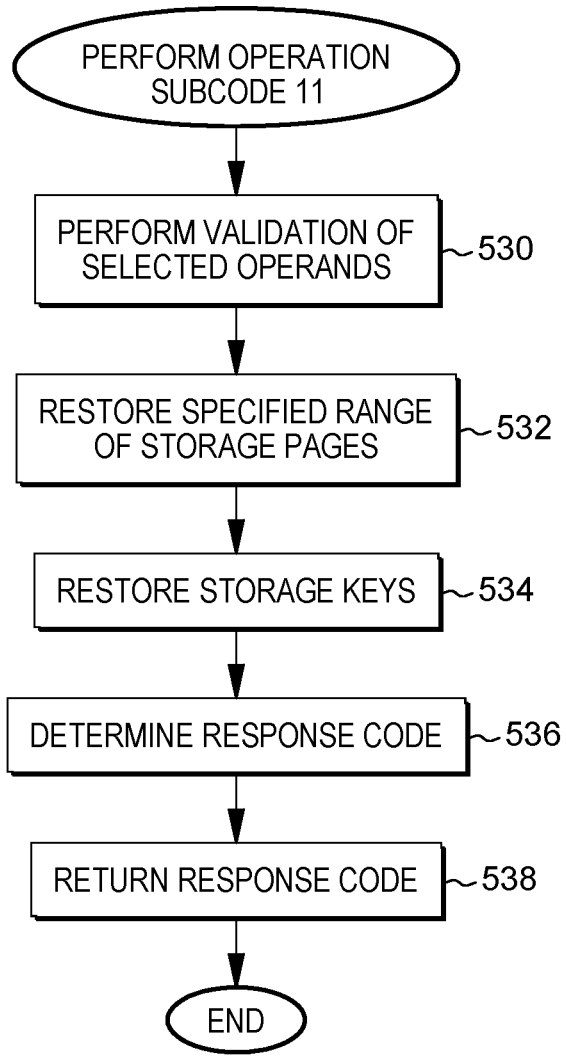
FIG. 5B depicts one example of further details of the performing an operation of FIG. 5A, in accordance with one or more aspects of the present invention.
Figure 5C:
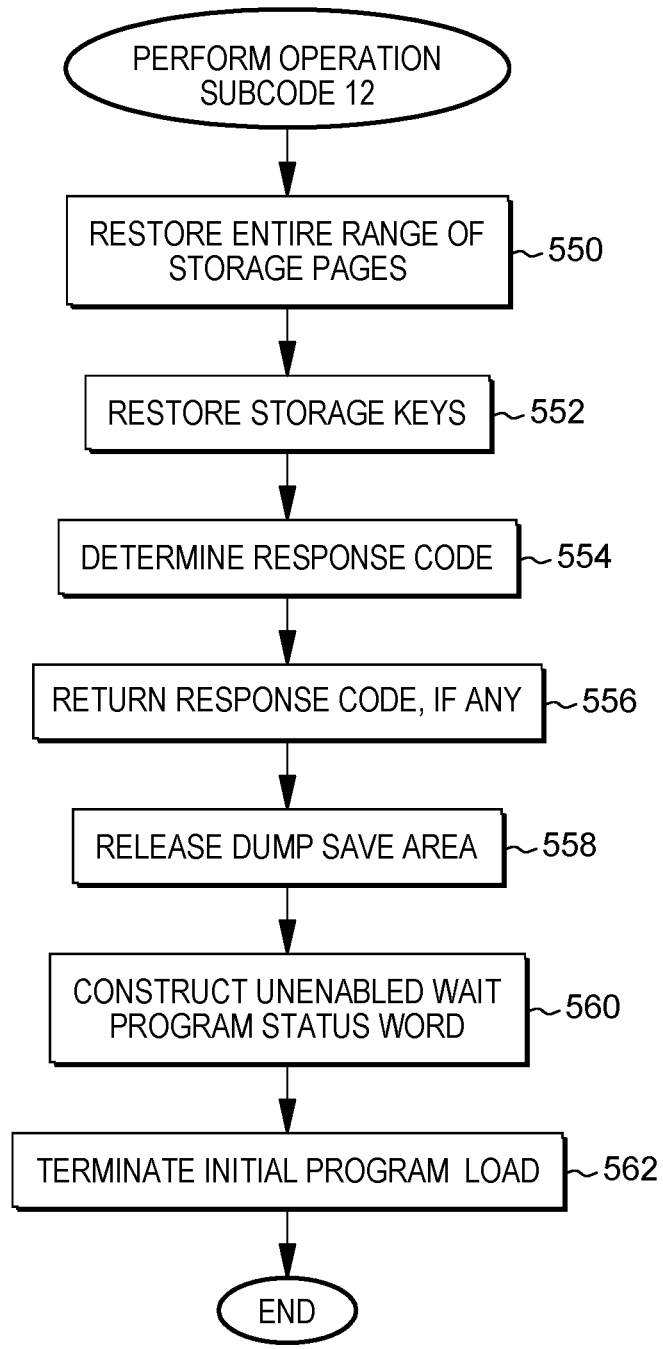
FIG. 5C depicts another example of further details of the performing an operation of FIG. 5A, in accordance with one or more aspects of the present invention.

Referring to FIG. 5A, in one example, a diagnose process 500 obtains 502 (e.g., receives, retrieves, fetches, is provided, pulls, is issued, etc.) an instruction, such as Diagnose instruction 400, and executes 510 the instruction. Execution includes, for instance, obtaining 512 one or more operands of the instruction. As examples, process 500 obtains one or more of: an operation code using opcode field 402, a subcode 442 using $R_3$ field 406, a logical address of dump pages area 420 using $R_1$ field 404, a starting page number 440 using $R_3$ field 406, and a page count 432 using $R_1$ field 404. In one or more embodiments, additional, fewer and/or other operands may be used. Many variations are possible.

Based on obtaining the operands, in one example, process 500 determines 514 the operation to be performed (e.g., as specified, e.g., by subcode 442). In one example, the operation is a Load Dump Pages From List-Directed IPL Dump Save Area operation specified by subcode 11. However, additional, fewer and/or other operations may be specified. Further, in other embodiments, a subcode is not specified, and instead, the operation is determined from another field of the instruction, such as one or more opcode fields, one or more other fields; or it is implied, etc. Many variations are possible.

In one example, based on determining the operation, process 500 performs 516 the operation. Further details relating to one example of performing the operation (e.g., the Load Dump Pages From List-Directed IPL Dump Save Area—Subcode 11) are described with reference to FIG. 5B.

In one embodiment, a process 516a performs validation 530 on one or more of the obtained operands. For example, process 516a determines if the starting page number 440 is, e.g., greater than the number of pages available in the dump save area, or the sum of the page count 432 and the current page number is greater than the number of pages available in the dump save area. If so, a selected response code 436 (e.g., 0203 hex) is returned in, e.g., selected positions of general register $R_1+1$ and no data or storage keys are stored. Storage accesses to the storage area where the specified range of storage pages and their associated storage keys are to be restored, pointed by the contents of general register $R_1$, are not subject, in one example, to low-address protection and key controlled protection.

Process 516a, assuming validation is successful, restores 532 the specified range of storage pages from the dump save area owned by the configuration (e.g., logical partition, operating system) into the specified storage area pointed to by logical address 420 in, e.g., general register $R_1$. This restores the failing machine state for the configuration by restoring, e.g., the portion of the storage area that was overlaid by, e.g., the boot loader and/or the dump program itself. Further, process 516a restores 534 the storage keys associated with the restored main storage in the configuration to the storage keys of the restored main storage that were present at the time when the main storage was saved in the dump save area.

Process 516a determines 536 a response code to be returned based on performing the store and restore. For example, when the issuing configuration does not own a dump save area, a selected response code 436 (e.g., 0304 hex) is returned in, e.g., selected positions (e.g., bit positions 48-63) of general register $R_1+1$ and no data or storage keys are stored.

When the page count 432 specified in general register $R_1+1$ is set to, e.g., zero and the issuing configuration owns a dump save area, a selected response code 436 (e.g., 0001 hex) is returned in, e.g., selected positions (e.g., bit positions 48-63) of general register $R_1+1$ and no data or storage keys are stored.

When an error is encountered while restoring one or more storage pages in the specified storage range, a selected response code 436 (e.g., 0002 hex) is returned in, e.g., selected positions (e.g., bit positions 48-63) of general register $R_1+1$. The contents of any such storage pages are unpredictable. In one example, no indication is given as to which pages in the specified storage range are affected. In another example, when a storage page cannot be restored, an error indication in, e.g., multiple formats is provided. For instance, a page of zeros with, e.g., an identifying string is stored in its place. The identifying string is stored in multiple formats (e.g., EBCDIC, ASCII, etc.) such that the error indication is in a readable format regardless of the format used to view the data of the storage.

When an error is encountered while restoring a storage key for any of the storage pages in the specified storage range, a selected response code 436 (e.g., 0002 hex) is returned in, e.g., selected positions (e.g., bit positions 48-63) of general register $R_1+1$. The contents of any such storage keys are unpredictable. In one example, no indication is given as to which storage pages in the specified storage range are affected.

Process 516a returns 538 the determined response code 436. This completes processing based on subcode 11.

In addition to subcode 11, Diagnose instruction 400 may also specify other subcodes, including, in accordance with an aspect of the present invention, subcode 12. Further details relating to subcode 12 are described below.

Figure 4E:
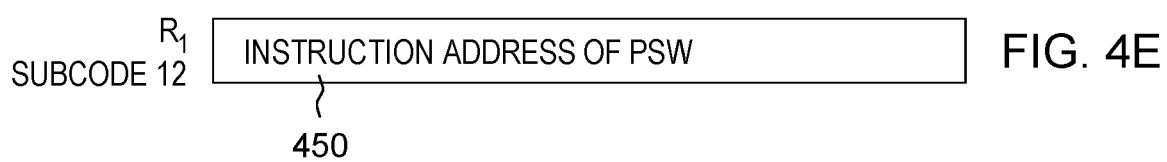
FIGS. 4E-4F depict one example of fields of a register pair used by another example execution of the diagnose instruction of FIG. 4A, in accordance with one or more aspects of the present invention.

Subcode 12—Restore Dump Pages from List-Directed Dump Save Area and Terminate IPL In one example, referring to FIG. 4E, when subcode 12 is specified, contents 404b of a general register $R_1$ designates, for instance, an instruction address 450 (e.g., 64-bit), such as a failing instruction address, to be used as the instruction address of an unenabled wait program status word (PSW) that will be constructed and loaded after the storage and associated storage keys are restored. The instruction address is not used to address data and is to conform, in one example, to a format of the instruction address of the program status word based on the current addressing mode. The remainder of the program status word is provided by, e.g., the hypervisor. In other embodiments, a control other than the program status word may be used.

Storage accesses to the storage area where the dump save area storage pages and their associated storage keys are to be restored, beginning at a selected location (e.g., absolute storage location 0), are not subject to low-address protection and key controlled protection.

Figure 4F:
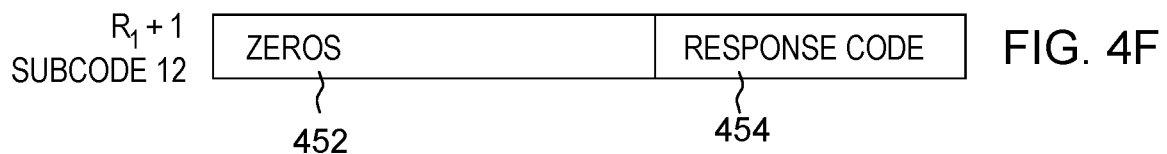
Figure 4G:
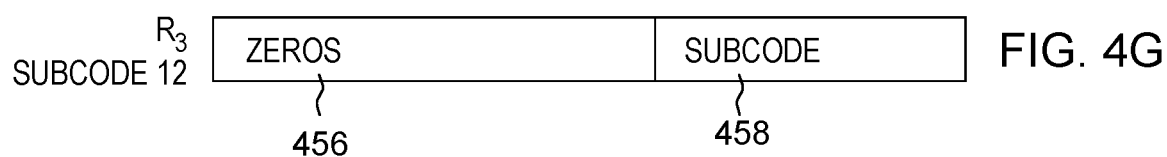
FIG. 4G depicts one example of fields of a register used by another example execution of the diagnose instruction of FIG. 4A, in accordance with one or more aspects of the present invention.

In one example, a response code 454 (FIG. 4F) is returned in, e.g., selected positions (e.g., bit positions 48-63) of contents 430b of general register $R_1+1$ in one or more defined situations, as described herein. Selected positions (e.g., bit positions 32-47) of general register $R_1+1$ are set to a selected value (e.g., zeros 452). Contents 406b (FIG. 4G) of general register $R_3$ includes a subcode 458 (e.g., bit positions 48-63), and selected bit positions (e.g., bit positions 0-47) are ignored and are to contain, e.g., zeros 456 for future compatibility. Other variations are possible.

In one example, subcode 12 stores the entire range of storage pages from the dump save area that is currently owned by the issuing configuration (e.g., logical partition, operating system, etc.) into storage (e.g., partition storage) beginning at a selected location (e.g., absolute storage location 0). The storage keys associated with the restored main storage in the configuration are set to the restored storage keys of the main storage that were present at the time when the main storage was saved in the dump save area. In one example, the first page in the dump save area is called a prefix page and it includes the dump save area metadata instead of the first page of the main storage area to be saved. This causes the saved main storage area to be off by, e.g., one page. For example, the 4K-byte main storage page located in, e.g., location 0 is stored in the second 4K-byte page of the dump save area because the first page of the dump save area contains the prefix page. When the dump program requests the entire dump save area to be loaded back to the same main storage area starting at, e.g., location 0, the first page of the main storage area starting at, e.g., location 0 would contain the prefix page instead of the actual contents of the first page of the main storage area that was saved from, e.g., location 0, and the actual contents of the first page of the main storage area starting at, e.g., location 0 is loaded at the main storage location 4K. To prevent this shifting of main storage area by, e.g., a 4K-byte storage page, the prefix page is not stored; instead, the data at location 4K is treated as the beginning of the actual dump data (first page of dump data) and the data is restored starting at location 4K of the dump save area into, e.g., location 0 of main storage.

When the issuing configuration does not own a dump save area, a selected response code 454 (e.g., response code of 0304 hex) is returned in, e.g., selected positions (e.g., bit positions 48-63) of general register $R_1+1$. No data is stored, no storage keys are set, and the unenabled wait program status word is not loaded.

When an error is encountered while restoring, or was encountered while saving, one or more storage pages in the specified storage range, the contents of any such storage pages are unpredictable. In one example, no indication is given as to which pages in the specified storage range are affected. In another example, when a storage page cannot be restored, an error indication in, e.g., multiple formats is provided. For instance, a page of zeros with, e.g., an identifying string is stored in its place. The identifying string is stored in multiple formats (e.g., EBCDIC, ASCII, etc.) such that the error indication is in a readable format regardless of the format used to view the data of the storage.

When an error is encountered while restoring, or was encountered while saving, a storage key for any of the storage pages in the specified storage range, the contents of any such storage keys are unpredictable. In one example, no indication is given as to which storage pages in the specified storage range are affected.

Upon completion of the memory restore and storage key restore functions, the dump save area owned by the issuing configuration is released. In one example, the hypervisor constructs an unenabled wait program status word using the failing instruction address 450 (e.g., 64-bit) of the issuing configuration provided in general register $R_1$ and loads it on the issuing central processing unit to terminate the list-directed IPL. Store status on loading mode is terminated.

Successful (or partially successful) completion is not communicated via response code back to the issuer since the issuing central processing unit will not receive control back.

In one example, referring to FIG. 5A, based on determining that a subcode 12 operation 514 is to be performed, process 500 performs 516 the operation. Further details relating to performing the operation for a Restore Dump Pages From List-Directed Dump Save Area and Terminate IPL (subcode 12) are described with reference to FIG. 5C.

In one embodiment, a process 516b restores 550 an entire range of storage pages from the dump save area that is currently owned by the issuing configuration (e.g., the configuration issuing the Diagnose instruction with subcode 12) back into partition storage beginning at a selected location (e.g., absolute storage location 0). Further, process 516b restores 552 the storage keys associated with the restored main storage in the configuration to the storage keys of the restored main storage that were present at the time when the main storage was saved in the dump save area.

Process 516a determines 554 a response code 454 to be returned based on performing the store and set, if any. For instance, when the issuing configuration does not own a dump save area, a selected response code 454 (e.g., response code of 0304 hex) is returned in, e.g., selected positions (e.g., bit positions 48-63) of general register $R_1+1$. No data is stored, no storage keys are set, and the unenabled wait program status word is not loaded.

When an error is encountered while restoring, or was encountered while saving, one or more storage pages in the specified storage range, the contents of any such storage pages are unpredictable. In one example, no indication is given as to which pages in the specified storage range are affected. In another example, when a storage page cannot be restored, an error indication in, e.g., multiple formats is provided. For instance, a page of zeros with, e.g., an identifying string is stored in its place. The identifying string is stored in multiple formats (e.g., EBCDIC, ASCII, etc.) such that the error indication is in a readable format regardless of the format used to view the data of the storage.

When an error is encountered while restoring, or was encountered while saving, a storage key for any of the storage pages in the specified storage range, the contents of any such storage keys are unpredictable. In one example, no indication is given as to which storage pages in the specified storage range are affected.

Process 516a returns 556 the determined response code.

Further, in one embodiment, based on completing the memory restore and the storage key restore, process 516b releases 558 the dump save area owned by the issuing configuration. This allows re-use of that dump save area.

Moreover, in one example, process 516b, using the hypervisor (e.g., hypervisor 172), constructs 560 an unenabled wait program status word using, e.g., the failing instruction address 450 (e.g., 64-bit) of the issuing configuration provided, e.g., in register $R_1$, and terminates 562 the list-directed initial program load by, for instance, loading the constructed unenabled wait program status word on the issuing central processing unit. Store status on loading mode is terminated.

In one example, successful (or partially successful) completion is not communicated via response code back to the issuer since the issuing central processing unit does not receive control back. This completes processing based on subcode 12.

In one example, as described herein, a response code is provided for subcode functions 11 and 12. Example response codes are provided below:

A response code of, e.g., 0001 hex indicates the function completed successfully and all the data is returned. It is provided for subcode 11. A response code of, e.g., 0002 hex indicates that the function was partially successful, and that partial data is returned. It is provided for subcode 11. In one example, response code, e.g., 0002 hex is provided when subcode 11 has been specified but an error is encountered while restoring one or more storage pages or their associated storage keys in the specified storage range.

Further, as examples, a response code, e.g., 0203 hex is provided when subcode 11 has been specified but the number of pages requested to be stored from the dump save area are not available; and a response code, e.g., 0304 hex, is provided when subcodes 11 and 12 have been specified but the guest does not own a dump save area.

Additional, fewer and/or other response codes may be provided. Further, the example values for the response codes are only examples. Other values may be provided.

In one or more examples, Diagnose '0308' can encounter program exceptions, examples of which are listed below. Additional, fewer and/or other exceptions may be provided. In each case, instruction execution is suppressed.

A privileged-operation exception is recognized if the central processing unit is in the problem state.

A specification exception is recognized when Diagnose is provided, but Diagnose '0308' is not provided or the specified subcode is not provided on the machine.

A specification exception is recognized when subcode 11 or 12 is not specified and selected positions (e.g., bit positions 0-47) of general register $R_3$ are not all zeros, as an example.

A specification exception is recognized when subcode 11 is specified and selected positions (e.g., bits 0-47) of general register $R_3$ are not zero and a secure-IPL from a selected device facility is not installed, or when subcode 11 is specified and selected positions (e.g., bits 32-47) of general register $R_3$ are not zero and the secure-IPL from a selected device facility is installed.

A specification exception is recognized when the subcode field in selected positions (e.g., bit positions 48-63) of general register $R_3$ contain a reserved subcode value.

A specification exception is recognized when the central processing complex is operating in basic mode and the instruction is not executed under interpretative execution.

A specification exception is recognized when subcode 11 or 12 is specified and the $R_1$ field does not designate an even numbered register.

A specification exception is recognized when subcode 11 is specified and the address specified by general register $R_1$ is not designated on a 4 k-byte boundary.

When subcode 11 or 12 is specified, the condition code is unchanged.

Example program exceptions include, for instance:
Access (store—subcode 11)
Privileged operation
Specification
Transaction constraint Additional, fewer and/or other program exceptions may be specified.

Described herein are examples of a diagnose instruction used to retrieve data stored in a selected area, such as a dump save area, use that data to restore machine state (e.g., store that data (e.g., data present at the time of initial program load and/or at a time of a program (e.g., operating system, boot loader, etc.) failure) at a selected location) and to restore storage keys associated therewith. One example of using the diagnose instruction is described with reference to FIG. 6. For instance, the diagnose instruction is used by an initial program load process. In one example, an initial program load process (e.g., an initial program load process 600) may be implemented using a module having one or more sub-modules and is executed by one or more computing devices (e.g., one or more computers (e.g., computer(s) 101, other computer(s), etc.), one or more servers (e.g., server(s) 104, other server(s), etc.), one or more processor(s), processor unit(s), node(s) and/or processing circuitry, etc. (e.g., of processor set 110 or other processor sets), and/or other computing devices, etc.). Although example computing devices, computers, servers, processors, processor units, nodes, and/or processing circuitry are provided, additional, fewer and/or other computers, servers, processors, processor units, nodes processing circuitry and/or computing devices may be used for the initial program load process and/or other processing. Various options are possible.

Figure 6:
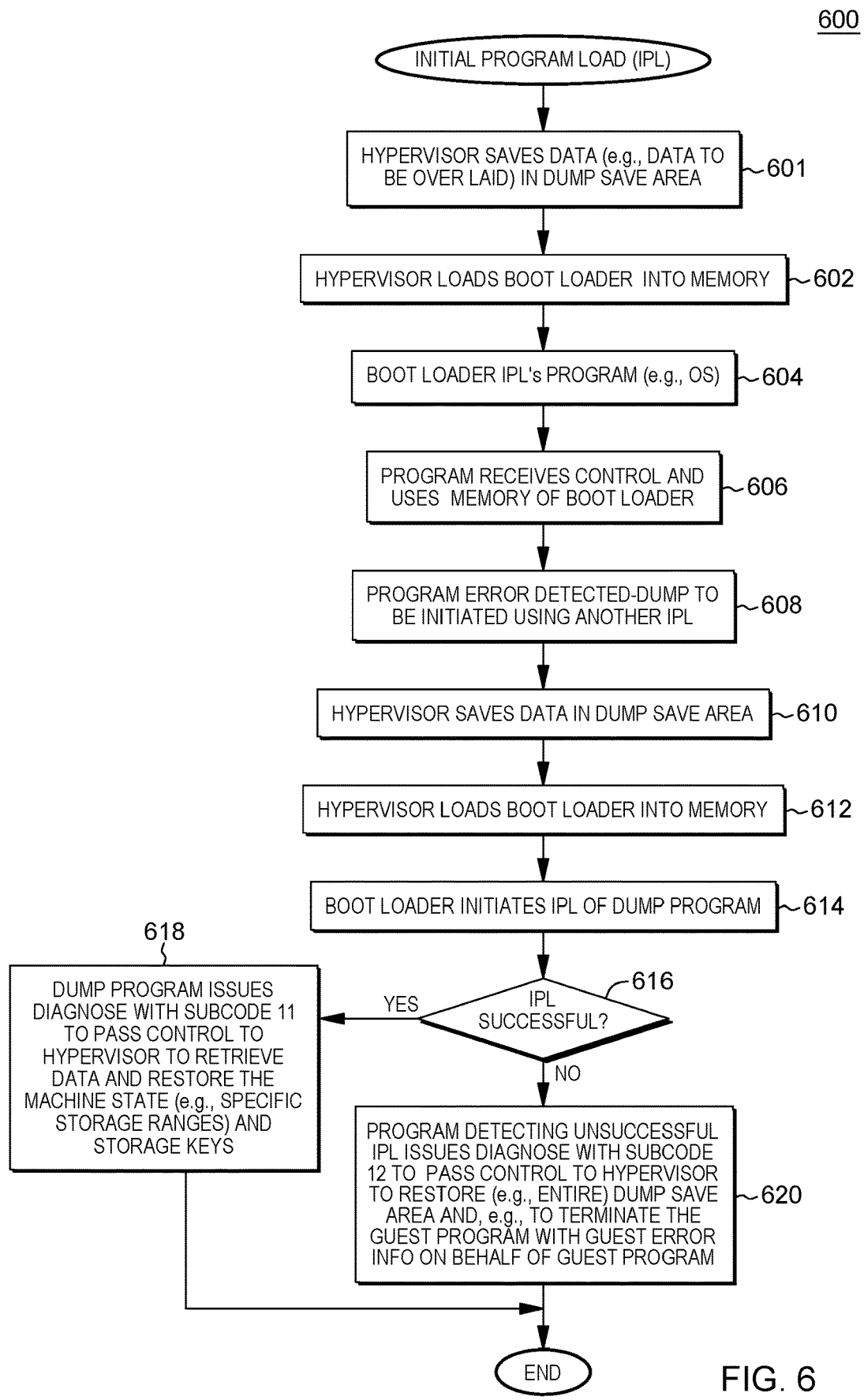
FIG. 6 depicts one example of using the diagnose instruction of FIG. 4A, in accordance with one or more aspects of the present invention.

Referring to FIG. 6, in one example, an initial program load process 600 saves 601, e.g., using a hypervisor (e.g., hypervisor 172), machine state (e.g., data that is to be overlaid) in a selected area (e.g., a dump save area). Process 600 loads 602 using, e.g., a hypervisor, a boot loader (e.g., boot loader 176) into a selected location (e.g., memory of a logical partition). Process 600 performs 604 an initial program load of a program (e.g., an operating system (OS)) using the loaded boot loader. Based on the initial program load, the program receives control 606 and is free to use the memory once occupied by the boot loader.

Process 600 detects 608, e.g., that a program error has occurred and that a dump is to be initiated by, e.g., a dump program. Based on detecting the error, a machine operator, as an example, initiates an initial program load of the dump program. Process 600 saves 610, e.g., using a hypervisor (e.g., hypervisor 172), machine state (e.g., the program's data) in a selected area (e.g., a dump save area). Process 600, using, e.g., the hypervisor, loads 612 the boot loader (e.g., boot loader 176) into memory (e.g., of a logical partition). Process 600 using the boot loader initiates 614 an initial program load of a dump program, which will use the data saved in the dump save area and, possibly, other data saved in memory to provide a dump to be used in debugging.

Process 600 determines 616 whether the initial program load of the dump program is successful. For instance, process 600 determines whether the initial program load of the dump program or execution of the dump program failed. If the initial program load or performance of the dump program was successful, process 600, via, e.g., the dump program, issues 618 the diagnose instruction subcode 11 to pass control to the hypervisor to retrieve the specified range of storage pages, to restore the machine state (e.g., store the specified range of storage pages in a selected location) and to retrieve the storage keys to restore the storage keys. However, if there was a failure that is not attributable to the dump program, process 600, via, e.g., the dump program or boot loader detecting the unsuccessful initial program load, issues 620 the diagnose instruction subcode 12 to pass control to the hypervisor (e.g., hypervisor 172) to access the dump save area in order to retrieve the stored data of the dump save area, restore the machine state and the storage keys and terminate the initial program load to enable a retry of a failed dump operation. Further, in one example, the hypervisor terminates the guest program (e.g., guest operating system) with guest error information on behalf of the guest program.

In one example, if the initial program load is unsuccessful due to a dump program or boot loader error, then another initial program load process and/or other error processing is performed. Other variations are possible.

Although an example of using a diagnose instruction is provided, additional and/or other examples are possible. One or more aspects of the processing described herein may be used for other purposes than described herein. Further, although various examples are provided for one or more formats of the instruction, additional and/or other formats may be used.

Other variations and embodiments are possible.

Figure 7A:
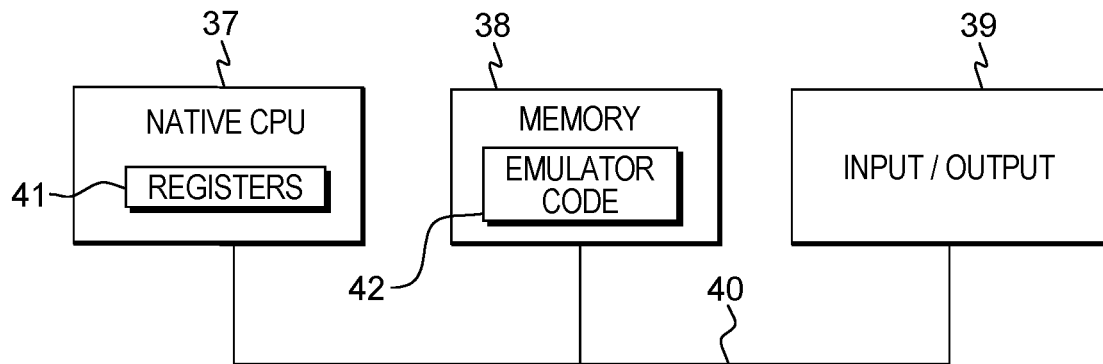
FIGS. 7A-7B depict another example of a computing environment to incorporate and use one or more aspects of the present invention.
Figure 7B:
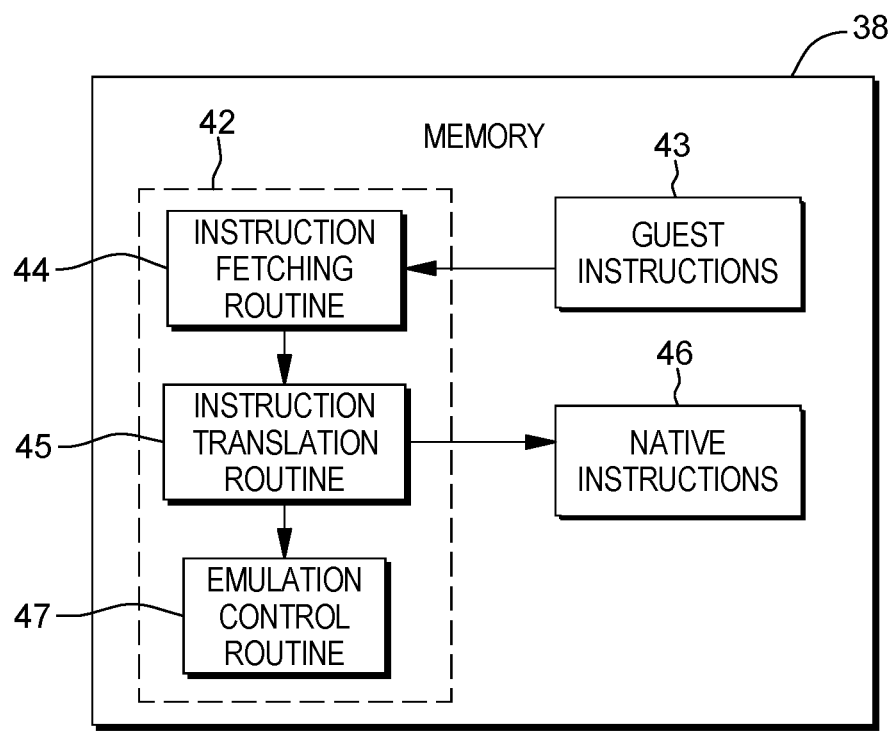

Further, although one or more examples of a computing environment to incorporate and use one or more aspects of the present invention are described herein, FIGS. 7A-7B depict another embodiment of a computing environment to incorporate and use one or more aspects of the present invention.

Referring, initially, to FIG. 7A, in this example, a computing environment 36 includes, for instance, a native central processing unit (CPU) 37 based on one architecture having one instruction set architecture, a memory 38, and one or more input/output devices and/or interfaces 39 coupled to one another via, for example, one or more buses 40 and/or other connections.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture (different from the one architecture) and to execute software and instructions developed based on the other architecture.

Further details relating to emulator code 42 are described with reference to FIG. 7B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the other instruction set architecture, but instead, are being emulated on native CPU 37, which may be, for example, the one instruction set architecture. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

An example instruction that may be emulated is the diagnose instruction described herein, in accordance with one or more aspects of the present invention.

The computing environments described herein are only examples of computing environments that can be used. One or more aspects of the present invention may be used with many types of environments. The computing environments provided herein are only examples. Each computing environment is capable of being configured to include one or more aspects of the present invention. For instance, each may be configured to implement diagnose and/or initial program load processing and/or to perform one or more other aspects of the present invention.

One or more aspects of the present invention are tied to computer technology and facilitate processing within a computer, improving performance thereof. For instance, restoration processing is facilitated, improving processing within a computing environment. By using a single architected instruction to perform a plurality of functions for a subcode relating to restoration, processing is streamlined and storage costs are reduced. Processing within a processor, computer system and/or computing environment is improved.

In one or more aspects, based on the program (e.g., bootloader or dump program) not knowing the dump save area length from which previously saved dump data is stored, an instruction is issued specifying a first dump save area page range (e.g., first page of dump save area) to obtain a dump prefix page and extracting the dump save area length. In one or more aspects, an instruction is issued specifying the storage range to restore data from the partial/full dump save area. The hypervisor, as an example, restores contents of the dump save area and the associated storage keys into, e.g., partition storage for the specified dump save area pages. Based on the hypervisor being unable to restore the data of one of the specified dump save area pages, an error is indicated by, e.g., formatting the error storage page with a specific character string in different character formats such that one of the character string formats appears in a readable format regardless of the data format used to view the storage data.

In one or more aspects, the software can obtain contents of either partial or all dump save area pages and their associated storage keys by specifying the starting dump save area page and a page count (dump save area offset and length). The restored storage key of each dump save area page ensures that the original storage protection mechanism still applies and is visible when viewing the dump data for storage access error analysis. A visible saved dump data recovery error character string allows the reader to easily identify the error dump data pages.

In one or more aspects, the program uses the same command that is used to retrieve the dump data from the dump save area to also find the length of the dump save area itself. The program specifies storage ranges to retrieve selected parts of the program's data area from the dump save area for later debugging purposes. The hypervisor restores the storage key (e.g., access control, fetch protection, store protection, reference and/or change indicators of the storage key) of each dump save area page for the specified dump save area pages to ensure that the original storage protection mechanism is still in effect.

In one or more aspects, a program can restore the original data (original machine state) that was overlaid by, e.g., the bootloader, operating system, or dump program back into the original storage location from the dump save area and then terminate initial program load using, e.g., the hypervisor. Further, in one or more aspects, the dump program can determine the size of the dump save area and how the dump program can retrieve selected parts of the program's data area from the dump save area for later debugging purposes using the same command.

In one or more aspects, a hypervisor may terminate initial program load on a program's behalf subsequent to restoring contents of the dump save area and associated storage keys into an original partition storage location when the initial program load of the dump program cannot be performed due to an error unattributable to the program. In one or more aspects, an instruction is issued (e.g., by the bootloader, operating system, or dump program) with the failing instruction address of an unenabled wait program status word to, e.g., the hypervisor to restore the dump save area and the associated storage keys into, e.g., the original partition storage location. The hypervisor restores contents of the dump save area and the associated storage keys into partition storage. The hypervisor releases the shared dump save area (e.g., to be used by other partitions). The hypervisor creates a unenabled wait program status word using the failing instruction address. The hypervisor terminates the initial program load via loading the unenabled wait program status word using the failing instruction address.

In one or more aspects, with, e.g., diagnose subcode 12, the original state of the machine is restored before terminating initial program load after an error is detected so that the dump can be retried. This is not something the dump program itself could do with other diagnose operations (e.g., Diagnose '0308' subcode 11), because the restored memory would wipe out the dump program before it could perform the other steps.

For instance, the program (e.g., dump program or boot loader) and the hypervisor work cooperatively to restore the contents of the dump save area and the associated storage keys into original partition storage location (original machine state) to enable a retry of a failed dump operation and terminate the initial program load upon detecting an error that is not attributable to the program. The program provides, for instance, the failing instruction address of the unenabled wait program status word to, e.g., the hypervisor to restore the dump save area and the associated storage keys into the original partition storage location since it cannot do it on its own. The hypervisor, in one example, restores the contents of the dump save area of the associated storage keys into original partition storage location on behalf of the program. In one example, the hypervisor creates an unenabled wait program status word using the program provided failing instruction address on behalf of the program. The hypervisor terminates the initial program load on behalf of the program by loading an unenabled wait program status word.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other instruction formats, operands and/or registers may be used. Although pages of memory or storage are mentioned, one or more aspects may be used for other units or sizes of memory or storage. Further, although a hypervisor is described herein as performing certain aspects in one or more embodiments, one or more of the aspects may be performed by one or more additional and/or other entities, components, etc. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   one or more non-transitory computer readable storage media and program instructions collectively stored on the one or more non-transitory computer readable storage media to perform a method comprising:
      obtaining an instruction to be executed within the computing environment, the instruction including an operation code indicating a diagnose operation; and
      executing the instruction, the executing including:
         retrieving selected data from a dump save area to be used to restore machine state;
         restoring the machine state, the restoring including storing the selected data in a selected location; and
         restoring one or more storage keys used to protect access to the selected data.

2. The computer program product of claim 1, wherein the selected location is a selected storage location specified using a field of the instruction.

3. The computer program product of claim 1, wherein the retrieving the selected data comprises:
   determining, using one or more selected fields of the instruction, a range of data to be retrieved from the dump save area; and
   retrieving the range of data from the dump save area.

4. The computer program product of claim 3, wherein the one or more selected fields include one field used to indicate a starting page number of the dump save area and another field used to specify a count of pages in the dump save area to be retrieved.

5. The computer program product of claim 1, wherein the method further comprises obtaining, based on an issuance of the instruction, metadata of the dump save area to determine information relating to the dump save area, the information to be used in further issuances of the instruction to specify the selected data to be retrieved from the dump save area.

6. The computer program product of claim 1, wherein the method further comprises:
   determining during the restoring of the machine state that an error occurred in a portion of the selected data being restored; and
   providing an indication of the error, based on determining the error, wherein the providing the indication of the error includes placing an error indication in a plurality of formats in the portion of the selected data to provide the indication of the error in a readable format regardless of a data format used to view the portion of the selected data in storage.

7. The computer program product of claim 1, wherein the selected location is an original storage location from which the selected data was obtained and placed into the dump save area.

8. The computer program product of claim 1, wherein the instruction designates, using a field of the instruction, an instruction address to be used as an instruction address of an unenabled wait program status word that is to be loaded, based on restoring the machine state and the one or more storage keys.

9. The computer program product of claim 1, wherein the method further comprises releasing the dump save area to be re-used.

10. The computer program product of claim 1, wherein the instruction is issued based on an error in an initial program load of a program, and wherein the method further comprises:
    creating an unenabled wait program status word using a failing instruction address provided using a field of the instruction; and
    terminating the initial program load, the terminating the initial program load comprising loading the unenabled wait program status word.

11. The computer program product of claim 10, wherein the method further comprises terminating a guest program, the selected data being data of the guest program.

12. A computer system for facilitating processing within a computing environment, the computer system comprising:
    a memory; and
    a processor in communication with the memory, wherein the computer system is configured to perform a method, said method comprising:
       obtaining an instruction to be executed within the computing environment, the instruction including an operation code indicating a diagnose operation; and
       executing the instruction, the executing including:
          retrieving selected data from a dump save area to be used to restore machine state;
          restoring the machine state, the restoring including storing the selected data in a selected location; and
       restoring one or more storage keys used to protect access to the selected data.

13. The computer system of claim 12, wherein the retrieving the selected data comprises:
    determining, using one or more selected fields of the instruction, a range of data to be retrieved from the dump save area; and
    retrieving the range of data from the dump save area.

14. The computer system of claim 12, wherein the selected location is an original storage location from which the selected data was obtained and placed into the dump save area.

15. The computer system of claim 12, wherein the instruction is issued based on an error in an initial program load of a program, and wherein the method further comprises:

creating an unenabled wait program status word using a failing instruction address provided using a field of the instruction; and terminating the initial program load, the terminating the initial program load comprising loading the unenabled wait program status word.

16. A computer-implemented method of facilitating processing within a computing environment, the computer-implemented method comprising:

obtaining an instruction to be executed within the computing environment, the instruction including an operation code indicating a diagnose operation; and executing the instruction, the executing including:
retrieving selected data from a dump save area to be used to restore machine state;
restoring the machine state, the restoring including storing the selected data in a selected location; and
restoring one or more storage keys used to protect access to the selected data.

17. The computer-implemented method of claim 16, wherein the selected location is a selected storage location specified using a field of the instruction.

18. The computer-implemented method of claim 16, wherein the retrieving the selected data comprises:

determining, using one or more selected fields of the instruction, a range of data to be retrieved from the dump save area; and retrieving the range of data from the dump save area.

19. The computer-implemented method of claim 16, wherein the selected location is an original storage location from which the selected data was obtained and placed into the dump save area.

20. The computer-implemented method of claim 16, wherein the instruction is issued based on an error in an initial program load of a program, and further comprising:

creating an unenabled wait program status word using a failing instruction address provided using a field of the instruction; and terminating the initial program load, the terminating the initial program load comprising loading the unenabled wait program status word.

\* \* \* \* \*